United States Patent [19]
Popat

[11] Patent Number: 5,598,000
[45] Date of Patent: Jan. 28, 1997

[54] DUAL-MODE AUTOMATIC WINDOW COVERING SYSTEM RESPONSIVE TO AC-INDUCED FLICKER IN AMBIENT ILLUMINATION

[76] Inventor: Pradeep P. Popat, 1515 S. Jefferson Davis Hwy., Apt. 1321, Arlington, Va. 22202

[21] Appl. No.: 567,244

[22] Filed: Feb. 22, 1996

[51] Int. Cl.$^6$ .................................................. H01J 40/14
[52] U.S. Cl. .......................... 250/206; 250/214 AL; 250/205; 359/601; 359/613
[58] Field of Search ................................ 250/206, 205, 250/214 D, 214 B, 214 AL, 554; 359/601–610, 613, 227–229; 40/25, 31; 362/276, 802; 318/266, 268, 286, 466–468, 480

[56] References Cited

U.S. PATENT DOCUMENTS

| | | | |
|---|---|---|---|
| 3,204,690 | 9/1965 | Nye | 160/176 |
| 3,294,152 | 12/1966 | Kuijvenhoven | 160/5 |
| 3,308,873 | 3/1967 | Dotto | 160/176 |
| 3,646,985 | 3/1972 | Klann | 160/168 |
| 4,041,308 | 8/1977 | Fujita | 250/226 |
| 4,079,388 | 3/1978 | Takahama | 354/31 |
| 4,173,721 | 11/1979 | Louis | 307/115 |
| 4,220,412 | 9/1980 | Shroyer | 356/218 |
| 4,255,899 | 3/1981 | Braithwaite | 49/2 |
| 4,279,240 | 7/1981 | Artusy | 49/25 |
| 4,396,831 | 8/1983 | Yamada | 250/201 |
| 4,595,946 | 6/1986 | Uehara | 358/29 |
| 4,622,470 | 11/1986 | Makino | 250/203 R |
| 4,631,675 | 12/1986 | Jacobsen et al. | 362/276 |
| 4,644,990 | 2/1987 | Webb | 160/5 |
| 4,742,813 | 5/1988 | Riehl | 126/425 |
| 4,827,119 | 5/1989 | Gaboury | 250/214 R |
| 4,841,672 | 6/1989 | Nebhuth | 49/25 |
| 5,087,936 | 2/1992 | Ogata | 354/430 |
| 5,142,133 | 8/1992 | Kern | 250/203.4 |
| 5,237,169 | 8/1993 | Grehant | 250/214 AL |
| 5,275,219 | 1/1994 | Giacomel | 160/6 |
| 5,413,161 | 5/1995 | Corazzini | 160/7 |

OTHER PUBLICATIONS

Lee, E. S., Selkowitz, S. E., Rubinstein, F. M., Klems, J. H., and Beltran, L. O., "Developing Integrated Envelope and Lighting Systems for Commercial Buildings", Mar. 1994, LBL Report No. 35412, Lawrence Berkeley Laboratory, Berkeley, CA, pp 1–6.

*Primary Examiner*—Que T. Le

[57] ABSTRACT

A system for the automatic operation of window coverings which is responsive to the presence of artificial illumination. A preferred embodiment, automatic window covering system 10, consists of a conventional optical flicker detector 11, a conventional control apparatus 12, and a conventional motorized window covering 13. Control apparatus 12 and motorized window covering 13 constitute an automatic window covering system capable of regulating the illumination passing through a host window, and of operating in a plurality of modes, including a thermal management mode (the object of which is to reduce heating and cooling loads) and a daylighting mode (the object of which is to reduce the need for artificial illumination). Optical flicker detector 11 detects the presence of the periodic variation, or flicker, in the illumination produced by electric lamps powered by alternating current. Flicker detector 11 is connected to control apparatus 12 in such a manner that control apparatus 12 is capable of registering the output of detector 11, and of selecting between the operating modes on the basis of the presence or absence of illumination flicker.

2 Claims, 5 Drawing Sheets

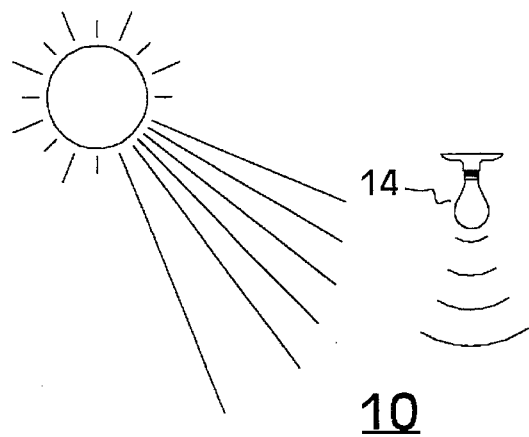
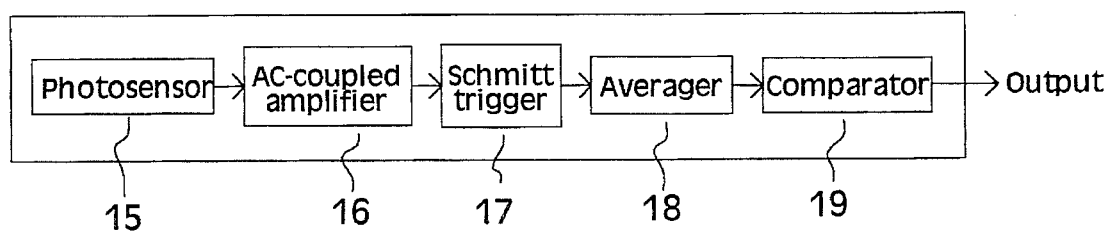
FIG. 1
FIG. 2

DUAL-MODE AUTOMATIC WINDOW COVERING SYSTEM RESPONSIVE TO AC-INDUCED FLICKER IN AMBIENT ILLUMINATION

BACKGROUND

CROSS-REFERENCES TO RELATED APPLICATIONS

This invention is related and complementary to the invention of my co-pending application, Ser. No. 08/505,845, filed 1995 Jul. 24.

1. Field of the Invention

This invention relates to automatic window coverings, specifically to a dual-mode automatic window covering which is responsive to the presence of artificial illumination.

2. Discussion of Prior Art

Energy-Savings Potential of Window Coverings

Window coverings offer the potential for significant energy savings, particularly in high-rise office buildings. These energy savings can occur in two ways. First, judicious use of window coverings can increase the net solar heat gain in winter and reduce the net solar heat gain in the summer, thereby reducing the energy consumed in heating and cooling. Second, by admitting a controllable amount of glare-free daylight, window coverings can reduce the energy consumed in artificial illumination, while helping to maintain a comfortable and healthy work environment. Horizontal venetian blinds are particularly appealing in this respect: they are widely used, easily adjusted, and capable of blocking direct solar radiation while still admitting indirect or diffuse daylight.

However, these two objects—thermal management, and use of daylight for illumination—often impose conflicting requirements on the position of the window covering. Thermal considerations usually require that the window covering be either fully opened (to maximize solar heat gain or radiative/convective cooling) or fully closed (to minimize solar heat gain or radiative/convective cooling). On the other hand, illumination considerations typically require that the window covering be set to some intermediate position to admit glare-free daylight. As a specific example, operation of a venetian blind for optimum thermal performance in the summer season might require that the blind louvers remain fully closed during the daytime and fully opened at night. However, operation of the same blind for optimum natural illumination might require that the louver tilt angle be set to some intermediate position during the daytime, to block direct solar radiation while still admitting a substantial amount of diffuse daylight.

However, from both the energy-savings and psychological standpoints, illumination and view considerations generally outweigh thermal considerations. Accordingly, it may be desirable to operate window coverings in a manner which provides glare-free daylight whenever illumination is required, and which minimizes heating and cooling costs at all other times.

Unfortunately, manually operating window coverings in this manner is inconvenient and seldom practiced. For example, Rubin et. al. found that occupants of a typical office building rarely adjusted the window coverings, instead leaving them in a preferred, fixed position (Rubin, A. I., Collins, B. L., and Tibbot, R. L., *Window Blinds as a Potential Energy Saver—A Case Study*, BSS 112, U.S. Department of Commerce, NBS, May 1978).

Automatic Window Coverings

Automatic window covering systems have been developed to address this problem. Prior-art automatic window covering systems can be grouped into four categories: Dusk/dawn systems, Timed systems, Daylighting systems, and Integrated Building Automation systems.

Dusk/Dawn Systems

Dusk/dawn systems automatically move the window covering to one predetermined position at dusk, and another predetermined position at dawn. Perhaps the earliest automatic venetian blind system capable of dusk/dawn operation is shown in U.S. Pat. No. 3,204,690 to Nye (1965). The venetian blind controller shown in my aforementioned co-pending application is a more recent system capable of dusk/dawn operation, as are the systems shown in U.S. Pat. Nos. 4,173,721 to Louis and 5,413,161 to Corazzini. U.S. Pat. No. 4,644,990 to Webb (1987) shows a system which automatically closes a blind (previously opened by hand) when the incident solar energy exceeds a predetermined value.

Each of the aforementioned dusk/dawn systems employs a photoelectric sensor, but thermo-mechanical systems are also known. For example, U.S. Pat. No. 4,255,899 to Braithewaite shows a system actuated by thermally-induced expansion of a special fluid, while U.S. Pat. No. 5,275,219 to Giacomel shows a system actuated by a shape-memory alloy spring (Giacomel also shows the use of an optional electrical heating element to effect electronic control of the system).

These dusk/dawn systems are effective at reducing the costs of heating and cooling, since they help to control the solar gain of the host window. However, they are not directed at daylighting (i.e., providing natural illumination to reduce the costs of artificial illumination), and provide little benefit in that regard.

Timed Systems

Timed systems automatically move the window covering to predetermined positions at predetermined times. One such system is the solenoid-operated venetian blind shown in U.S. Pat. No. 4,173,721 to Louis (1979), which is capable of automatically opening and closing the blind at various predetermined times during the day. Many timed systems are commercially available; one available system is the Automatic Drapery Opener System, manufactured by Makita U.S.A. Inc., of La Mirada, Calif. This system provides up to four timed, automatic operations of a drapery in each 24-hour period. Such a system could be programmed to position the drapery to provide illumination during working hours, and for optimum thermal management at all other times.

However, the inability of timed systems to automatically adapt their operation to changing levels of sunlight (e.g., due to changes in weather or season), or changes in the work schedule of the room occupants, is a significant disadvantage which limits their energy-saving potential.

Daylighting Systems

Daylighting systems automatically operate a window covering to provide natural illumination. One type of daylighting system operates adaptively to maintain a constant, predetermined level of interior illumination, as sensed by a photoelectric sensor. Such systems include:

the automatic roller-shade-type window screen system shown in U.S. Pat. No. 3,294,152 to Kuijvenhoven (1966);

the automatic venetian blind shown in U.S. Pat. No. 3,646,985 to Klann (1972); or the automatic skylight shutter control system shown in U.S. Pat. No. 4,622,470 to Makino (1986).

Another type of daylighting system operates adaptively to screen direct solar radiation; thereby avoiding glare. Such systems include:

the automatic slatted sun-protection device shown in U.S. Pat. No. 4,841,672 to Nebhuth (1989); and the automatic venetian blind controller shown in U.S. Pat. No. 5,142,133 to Kern (1992).

However, these daylighting systems are not directed toward thermal management, and provide no energy-saving benefit in that regard.

Integrated Building Automation Systems

These systems integrate automatic window coverings with lighting, heating, cooling, and security equipment, typically using a central control computer. Depending on the sensors and software included, they are capable of automatically operating window coverings to manage solar gain as well as provide natural illumination.

One type of integrated building automation system couples an electronically controlled window covering with a continuous-dimming electric lighting apparatus. Such a system can substantially reduce the costs of artificial illumination, since it is capable of automatically dimming the electric lights when daylight is present. There has been considerable research in this area, particularly at the Energy and Environment Division of Lawrence Berkeley Laboratory (LBL), Berkeley, Calif. For example, Papamichael et. al. provide an early estimate of the energy-savings potential of such a system (Papamichael, K., F. Rubinstein, S. Selkowitz, and G. Ward, "The Integration of Operable Shading Systems and Electric Lighting Controls," November 1986, LBL Report No. 20536, Lawrence Berkeley Laboratory, Berkeley, Calif.). More recently, research at LBL has focused on practical implementations of such systems (see, for example, Lee, E. S., Selkowitz, S. E., Rubinstein, F. M., Klems, J. H., and Beltran, L. O., "Developing Integrated Envelope and Lighting Systems for Commercial Buildings", March 1994, LBL Report No. 35412, Lawrence Berkeley Laboratory, Berkeley, Calif.). As another example of the art in this area, U.S. Pat. No. 5,237,169 to Grehant (1993) shows a practical implementation of an algorithm to sequence the operation of automatic lighting and window covering equipment, with energy savings as a primary object.

However, while such systems are capable of providing benefits in both daylighting and thermal management, they suffer from four significant disadvantages:

They are prohibitively expensive for many applications: the systems are complex and typically include an electronically controlled window covering, continuous-dimming lighting equipment, a control apparatus, and a wall switch or control panel. The cost of these elements is substantial, as is the cost of their installation.

They are integrated systems; all elements must be present for proper operation. Thus, these systems typically cannot be purchased and installed incrementally.

These systems require electrical links between the various elements. These elements may be dispersed within the host room (e.g., with the window covering located on an outside wall, the lighting equipment located in the ceiling, and the control apparatus built-in to the wall). Thus, the necessary electrical links may be long, and their installation typically requires the services of a professional electrician. Some systems use wireless links between the various components, but these increase cost. Moreover, use of a wireless link with an electronically controlled window covering would increase the quiescent power consumption, thus reducing the feasibility of solar-powered operation. This is a major disadvantage, since solar-powered operation provides numerous benefits (as described in my aforementioned co-pending application).

Thus, the known integrated systems suffer from significant practical limitations.

Occupancy Sensors Coupled to Electronically Controlled Window Coverings

As previously stated, certain Integrated Building Automation systems are capable of automatically operating electronically controlled window coverings to manage solar gain, as well as to provide natural illumination. However, as previously stated, these objects often impose conflicting constraints on the required position or state of the window covering.

Some Integrated systems use a conventional occupancy sensor to register the presence of an occupant, so that electric lights can be automatically turned on and off in response to room occupancy. With appropriate modifications to the software, such a system could also—in principle—automatically adjust the window covering to predetermined states as a function of the output of the occupancy sensor. For example, such a system could be programmed to automatically adjust the window covering to provide natural illumination when an occupant is present, and to screen out solar radiation when an occupant is absent. However, so far as is known, such a capability is not currently provided by known systems, and (as previously stated), integrated systems are prohibitively complex and expensive for many applications.

However, it is possible to interface an occupancy sensor directly to an electronically controlled window covering, thereby providing occupancy-dependent operation without much of the cost and complexity of the integrated systems.

Many types of occupancy sensor are known in the art; the most popular types include Passive Infra-Red (PIR) detectors and ultrasonic or microwave Doppler radars. These sensors are used extensively in applications such as automatic door openers, burglar alarms, building-automation systems, and automatic light switches (in fact, many office buildings are currently being retrofitted with PIR-based automatic light switches). However, these occupancy sensors suffer from four significant disadvantages in the context of automatic window coverings.

First, these sensors are typically directional and require careful placement and orientation, as a well as an unobstructed path between the sensor and the occupant. Often, this presents no problem, since there is generally an unobstructed path between the automatic window covering mechanism (typically mounted near the top of the window) and typical occupant seating positions. However, decorative valances or layered curtains are sometimes used; these can obscure the path between the automatic window covering and the occupant, disrupting sensor operation. In addition, even when an unobstructed path is available, these sensors are sometimes prone to unreliable operation due to their limited field-of-view.

Second, even with ideal placement and orientation, these sensors are sometimes prone to false and missed detections. Strong reflected sunlight can cause false alarms with PIR sensors. Thermal gradients and air currents can cause false alarms with ultrasonic Doppler radar sensors. And since both ultrasonic and microwave Doppler radar sensors (as well as some PIR sensors) are sensitive only to movement, they can fail to detect the presence of a sedentary occupant.

Third, the physical size of known occupancy sensors is often excessive. In the case of PIR detectors, a reflector or lens is often required to provide the desired spatial response characteristics; similarly, microwave radars typically require an antenna, and ultrasonic radars generally include transducers of substantial size. This size is an aesthetic liability, and precludes the inclusion of such sensors in many conventional automatic window coverings.

Fourth, known occupancy sensors may be prohibitively expensive for low-cost automatic window coverings. The cost of microwave and ultrasonic radars is generally higher than that of modern PIR sensors. However, although the cost of PIR sensors has diminished substantially in the recent past, it is still excessive for many applications when the costs of ancillary components (e.g., reflector, lens, and required electronic signal processing circuitry) are considered.

For these reasons, the coupling of conventional occupancy sensors with electronically controlled window coverings is an inadequate solution to the problem of providing an automatic window covering which is responsive to the need for illumination.

SUMMARY OF PRIOR-ART LIMITATIONS

As discussed above, prior-art systems for automatic operation of window coverings suffer from one of two disadvantages: they are unable to both manage solar gain and provide natural illumination, or they are excessively complex and expensive. These disadvantages have prevented full realization of the enormous energy-saving potential of automatic window coverings in the commercial office environment.

OBJECTS AND ADVANTAGES

It is therefore an object of this invention to provide an automatic window covering system which:

can respond automatically to the need for interior illumination;

includes both a daylighting mode of operation and a thermal management mode of operation, with the selection of mode automatically made on the basis of need for interior illumination;

avoids the need for large, directional, expensive, or unreliable sensors;

requires no physical connections to the lighting system or other equipment; and is inexpensive.

Further objects and advantages will become apparent from a consideration of the drawings and ensuing description.

DESCRIPTION OF DRAWINGS

FIG. 1 is a block diagram of an automatic window covering system according to the subject invention.

FIG. 2 is a block diagram of a preferred embodiment of a flicker detector.

Figure 3:
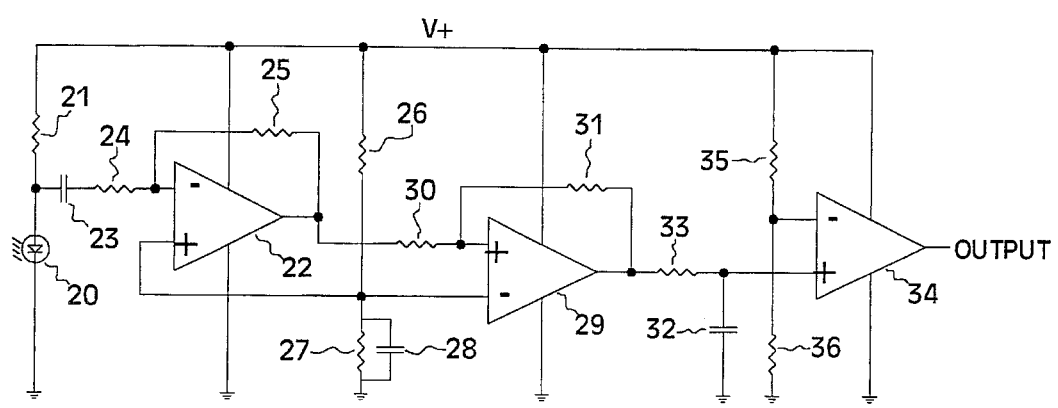
FIG. 3 is a schematic diagram of the preferred embodiment of the flicker detector.

| LIST OF REFERENCE NUMERALS | |
|---|---|
| 10 | Automatic window covering |
| 11 | Optical flicker detector |
| 12 | Control apparatus |
| 13 | Motorized window covering |
| 14 | Electric lamp |
| 15 | Photosensor |
| 16 | AC-coupled amplifier |
| 17 | Schmitt trigger |
| 18 | Averager |
| 19 | Comparator |
| 20 | photodiode |
| 21 | biasing resistor |
| 22 | op-amp |
| 23 | coupling capacitor |
| 24 | input resistor |
| 25 | feedback resistor |
| 26 | biasing resistor |
| 27 | biasing resistor |
| 28 | bypass capacitor |
| 29 | op-amp |
| 30 | input resistor |
| 31 | feedback resistor |
| 32 | averaging capacitor |
| 33 | averaging resistor |
| 34 | op-amp |
| 35 | biasing resistor |
| 36 | biasing resistor |
| 37 | microcontroller |
| 38 | Switching array |
| 39 | position feedback sensor |
| 40 | manual switch array |
| 41 | daylight sensor |
| 42 | electric motor |
| 43 | movable shading device |
| 44–62 | software steps |
| 63 | amplitude detector |
| 64 | amplifier |
| 65 | bandpass filter |
| 66 | Phase-Locked Loop (PLL) |
| 67 | lock detector |

SUMMARY OF THE INVENTION

My invention is an automatic window covering system which has two modes of operation—a Daylighting mode directed toward providing glare-free natural illumination, and a Thermal Management mode directed toward minimization of heating and cooling costs—with the former mode automatically engaged whenever interior illumination or an outdoor view is required.

My invention exploits the fact that the need for interior illumination and the presence of artificial illumination are well-correlated in the commercial office environment. In order to conserve energy, it is generally office policy that lamps be extinguished when not needed; similarly, when occupants are working, at least a small amount of artificial illumination is almost always required—even on sunny days.

Accordingly, a preferred embodiment of my invention comprises a conventional electronically controlled window covering, a conventional control apparatus, and a conventional illumination flicker detector which is responsive to the periodic variation in light intensity characteristic of AC-powered electric lamps. Thus, the flicker detector is capable of distinguishing between AC-powered artificial illumination and daylight. The output of the flicker detector is registered by the control apparatus, which, in turn, actuates the electronically controlled window covering.

When artificial illumination is present, the electronically controlled window covering is operated in a Daylighting mode to admit glare-free natural illumination; when artificial illumination is not present, the electronically controlled window covering is operated in a Thermal Management mode to reduce solar heat gains in summer and maximize solar heat gains in winter.

Since the flicker detector is optical, it requires no physical connection to the lighting system (thereby avoiding the cost of hard wiring). Due to the sensitivity of the flicker detector and the relatively large amplitude of the illumination flicker, the sensor is immune to false alarms and responds well to reflected light (and is, therefore, effectively non-directional). In addition, the flicker detector is far less expensive and smaller than known occupancy sensors, and is even less expensive than installation of a control wire between the existing light switch and the electronically controlled window covering.

DESCRIPTION OF THE PREFERRED EMBODIMENT

FIG. 1: Block Diagram of Automatic Window Covering System 10

FIG. 1 shows a block diagram of an automatic window covering system 10 according to the subject invention. It consists of a flicker detector 11, a control apparatus 12, and an electronically controlled window covering 13. Apparatus 10 is used in an environment which is periodically exposed to both sunlight and artificial light, the latter originating from an electric lamp 14. Electric lamp 14 could be either an incandescent or fluorescent type, and is powered from the Alternating Current (AC) power mains.

Flicker Detector 11

As is well-known in the art, the use of AC power gives rise to a periodic variation—or flicker—in the illumination produced by lamp 14. This flicker generally has a fundamental frequency twice that of the AC frequency, with two salient exceptions:

- As an energy-saving feature, some incandescent lamps include a rectifier between the AC powerline and the bulb; in this case, the flicker frequency is equal to the powerline frequency.
- Some fluorescent lamps include a high-frequency electronic ballast; in this case, the flicker frequency can be significantly higher than twice the powerline frequency.

In the majority of cases, however, the fundamental flicker frequency is equal to twice the powerline frequency (e.g., a 120 hertz flicker frequency for 60 hertz AC power).

Flicker detector 11 is a conventional type of optoelectronic detector capable of sensing this flicker, whether produced by incandescent or fluorescent illumination. Such flicker detectors have been developed for use in various types of cameras to improve color fidelity under various lighting conditions.

A preferred embodiment of flicker detector 11 will be subsequently described in detail.

Control Apparatus 12

Flicker detector 11 drives control apparatus 12 of conventional design. Control apparatus 12 registers the presence or absence of artificial illumination based on the output of flicker detector 11, and accordingly regulates the operation of electronically controlled window covering 13. A preferred embodiment of control apparatus 12 will be described subsequently.

Electronically Controlled Window Covering 13

Electronically controlled window covering 13 can be any window covering whose solar-optical properties can be varied in response to an electrical signal. In the preferred embodiment, electronically controlled window covering 13 is a conventional, motorized, horizontal venetian blind. Such a blind consists of an array of horizontal louvers whose orientation, or tilt, can be electronically varied through operation of an electric motor. Many such motorized venetian blinds are known, such as:

- the automatic venetian blind shown in U.S. Pat. No. 5,413,161 to Corazzini (1995);
- the model MB-1000 motorized miniblind manufactured by Solartronics, Inc., of Buffalo, N.Y.; or
- the automatic venetian blind control system shown in my co-pending application, Ser. No. 08/505,845, filed 1995 Jul. 24.

Any one of these (or any other conventional motorized horizontal venetian blind) could be used as electronically controlled window covering 13. However, other types of electronically controlled window coverings could also be used, as will be subsequently discussed.

FIGS. 2 and 3: Preferred Embodiment of Flicker Detector 11

Referring now to FIGS. 2 and 3, a preferred embodiment of flicker detector 11 will be described in detail. FIG. 2 shows a block diagram of a preferred embodiment, while FIG. 3 shows a schematic diagram of the same embodiment.

FIG. 2: Block Diagram of Flicker Detector 11

General Configuration

As shown in FIG. 2, flicker detector 11 includes a photosensor 15 which drives an AC-coupled amplifier 16. Amplifier 16 amplifies the AC flicker component of the output of photosensor 15, while blocking the DC component. The output of amplifier 16 is a sinusoidal waveform (in the case of incandescent illumination) or a near-sinusoidal waveform (in the case of fluorescent illumination), with an average value equal to one-half the supply voltage and a typical fundamental frequency of 120 hertz (assuming a powerline frequency of 60 hertz). Amplifier 16 drives a schmitt trigger 17, whose output is approximately equal to ground potential when the output of amplifier 16 is less than a first predetermined threshold, and approximately equal to the supply voltage when the output of amplifier 16 exceeds a second predetermined threshold. These first and second predetermined thresholds are selected so that schmitt trigger 17 triggers on the flicker signal at the output of amplifier 16, but not on 60 hertz electrical noise (which will generally be much smaller than the flicker signal, when artificial illumination is present). Thus, when flicker is present, the output of schmitt trigger 17 will be a rectangular wave of amplitude approximately equal to the supply voltage; when no flicker is present, the output will be at ground potential. Schmitt trigger 17 drives an averager 18, which produces an output voltage proportional to the input voltage averaged over a period of approximately one second. Thus, when incident flicker persists for substantially longer than one second, the output of averager 18 is a DC signal of amplitude approximately equal to one-half the supply voltage; when no flicker is present, the output of averager 18 is at ground potential. The averaging function reduces the sensitivity of flicker detector 11 to short-term fluctuations in the ambient illumination (e.g., fluctuations caused by movements of people or objects in the room). Averager 18 drives a comparator 19, whose output is equal to the supply voltage when the output of averager 18 exceeds a predetermined threshold, and at ground potential when the output of averager 18 is below this predetermined threshold.

Thus, it can be seen that flicker detector 11 produces a DC signal in the presence of incident flicker. Those versed in the art will recognize many other approaches to achieve the same object, but the approach illustrated in FIG. 2 is capable of reliable performance at low cost.

Requirements for Photosensor 15

Still referring to FIG. 2, there are four primary requirements for photosensor 15. First, it must have sufficient sensitivity to detect the AC-induced flicker even when the source of the flicker is relatively far—or shielded—from photosensor 15. Second, photosensor 15 must have sufficient dynamic range to detect the AC-induced flicker even in the presence of fairly bright sunlight. Third, photosensor 15 must have a broad enough spectral characteristic to detect the illumination produced by both fluorescent and incandescent lamps. Fourth, photosensor 15 must be relatively inexpensive. These requirements are met by a variety of conventional sensors, including photodiodes, phototransistors, and photoresistors. However, conventional photodiodes operated in the photoconductive mode (i.e., reverse-biased) perhaps offer the best mix of performance (especially dynamic range) and price. The only constraint is that photodiodes with a built-in InfraRed (IR) bandpass optical filter should be avoided, as these devices exhibit poor sensitivity to illumination from fluorescent sources. The so-called "blue-enhanced" photodiodes, with improved response at shorter wavelengths, will yield even greater sensitivity to fluorescent sources, at some increase in cost.

Requirements for Amplifier 16

The purpose of AC-coupled amplifier 16 is to amplify the AC component of the output of photosensor 15. The requirements for amplifier 16 are modest; the AC output of photosensor 15 will generally have a frequency much lower, and an amplitude much higher, than that of typical audio signals. Thus, the required gain-bandwidth product of amplifier 16 is less than that of typical audio preamplifiers. A gain-bandwidth product of 10 kilohertz, which is within the capabilities of a wide range of low-cost integrated-circuit amplifiers, will generally be more than adequate. The AC coupling between photosensor 15 and amplifier 16 should be selected for a high-pass corner frequency of between 10 and 60 hertz, but this value is non-critical.

Requirements for Schmitt Trigger 17

Schmitt trigger 17 can be any conventional implementation of a schmitt trigger (i.e., a comparator with hysteresis). The required amount of hysteresis will depend on factors such as the ambient electromagnetic environment and the amount of electromagnetic shielding of the housing (not shown) of flicker detector 11. A hysteresis band of approximately ten percent will prove adequate in most cases.

Requirements for Averager 18 and Comparator 19

Averager 18 and comparator 19 present no special requirements. Averager 18 is most easily realized as a passive RC network, although active op-amp-based integrators could also be used (the former approach is used in the preferred embodiment). No hysteresis is required in comparator 19; it can be implemented via a specialized comparator integrated circuit, or via an op-amp (the latter approach is taken in the preferred embodiment).

FIG. 3: Schematic Diagram of Flicker Detector 11

FIG. 3 shows a schematic diagram of the preferred embodiment of flicker detector 11 (previously shown, in block diagram form, in FIG. 2). Although FIG. 3 functionally encompasses all the elements shown in FIG. 2, the FIG. 2 reference numerals are omitted from FIG. 3 for sake of visual clarity.

Photosensor 15

Photosensor 15 of FIG. 2 consists, as shown in FIG. 3, of a photodiode 20 which is reverse-biased through a biasing resistor 21. Illumination flicker incident on photodiode 20 produces a voltage fluctuation at the junction of photodiode 20 and resistor 21. As previously stated, the requirements for photodiode 20 are non-critical, except that it should not include an IR bandpass optical filter. As is well-known in the art, biasing resistor 21 determines the gain (i.e., the ratio of output voltage to incident illumination) of the resistor-photodiode combination, and also (through interaction with the photodiode capacitance) the response time of the combination. Since the desired output signal (i.e., the nominally 120 hertz flicker) is of a relatively low frequency, a large value can be used for resistor 21 to provide a relatively high gain. A value of 0.5 megohm is used in the preferred embodiment, although this value is non-critical.

AC-Coupled Amplifier 16

AC-coupled amplifier 16 of FIG. 2 consists, as shown in FIG. 3, of an operational amplifier (op-amp) 22, a DC-blocking or coupling capacitor 23, an input resistor 24, a feedback resistor 25, and a biasing network consisting of resistors 26 and 27 and bypass capacitor 28. This well-known, capacitively-coupled inverting amplifier configuration, described extensively in the literature, amplifies the flicker-induced voltage fluctuation at the junction of photodiode 20 and resistor 21. The low-frequency cutoff of this configuration is established by the series combination of capacitor 22 and input resistor 23, while the gain is established by the ratio of feedback resistor 24 to input resistor 23. Biasing resistors 25 and 26 should be selected to bias the positive input of op-amp 22 (and hence the average value of its output) to one-half the supply voltage. Capacitor 28 bypasses AC noise at the positive input of op-amp 22. Values for elements 22 through 26 should be selected in accordance with conventional practice to provide a gain of approximately 100, with a low-frequency cut-off of between 10 and 60 hertz. In the preferred embodiment, capacitor 23 has a value of 0.01 microfarads, resistor 24 has a value of 1 megohm, resistor 25 has a value of 10 megohms, resistors 26 and 27 each have a value of 2.2 megohms, and capacitor 28 has a value of 0.1 microfarads. Op-amp 22 can be almost any modern op-amp. For example, if cost is of concern, then the LM 124 series (manufactured by National Semiconductor Corp.) could be used. If power consumption is of concern, then the MAX406 or MAX417 series (manufactured by Maxim Corp.) could be used. In the preferred embodiment, op-amp 22 is one of the four op-amps contained in the quad-op-amp MAX418 integrated circuit.

Schmitt Trigger 17

Schmitt trigger 17 of FIG. 2 consists, as shown in FIG. 3, of an op-amp 29, input resistor 30, and feedback resistor 31. This conventional schmitt trigger configuration, described extensively in the literature, is driven by the output of op-amp 29. As is well-known in the art, the average trip point or threshold of this configuration is set by the potential at the negative input of op-amp 29, while the amount of hysteresis is set by the ratio of the value of resistor 31 to that of resistor 30. Since the negative input of op-amp 29 is connected to the positive input of op-amp 22, the average trip point of schmitt trigger 17 is equal to the average voltage at the output of op-amp 22. Thus, any AC component at the output of op-amp 22 which exceeds the hysteresis band established by resistors 30 and 31 will produce a rectangular waveform (a square wave in the case of incandescent illumination, and a near-square wave in the case of fluorescent illumination) at the output of op-amp 29. In the preferred embodiment, the values of resistor 30 and resistor 31 provide hysteresis band of approximately 10 percent relative to the average trip point (i.e., 10 percent of one-half the supply voltage, as appears at the junction of biasing resistors 26 and 27). Op-amp 29 can be almost any modern op-amp; the exemplar devices cited above for op-amp 22 could also be used for op-amp 29. In the preferred embodiment, op-amp 29 (like op-amp 22) is one of the four op-amps contained in the quad-op-amp MAX418 integrated circuit.

Alternatively, a dedicated schmitt trigger integrated circuit could also be used.

Averager 18

Averager 18 of FIG. 2 consists, as shown in FIG. 3, of capacitor 32 and resistor 33. Capacitor 32, charged through resistor 33, averages or smoothes the output of op-amp 29. As previously stated, capacitor 32 and resistor 33 should be selected for a time constant of approximately one second, but this value is not critical. If the time constant is too short, flicker detector 11 will be susceptible to false triggering due to illumination fluctuations (e.g., as a result of people or objects moving in the room); if the time constant is too long, there may be an objectionable delay in the response of flicker detector 11. [It should be noted here that the time constant of the combination of capacitor 32 and resistor 33 establishes the response time of flicker detector 11 to incident flicker, but not necessarily the response time of electronically controlled window covering 13 (shown in FIG. 1) to the output of flicker detector 11. As will be subsequently discussed, a relatively long response time of electronically controlled window covering 13 to changes in the presence of illumination flicker may be desirable, and can be conveniently implemented in control apparatus 12 of FIG. 1].

Comparator 19

Comparator 19 of FIG. 2 consists, as shown in FIG. 3, of op amp 34, biasing resistor 35, and biasing resistor 36. The positive input of op-amp 34 is connected to the high side of capacitor 32. The output of op-amp 34 is at ground potential when the voltage across capacitor 32 is less than the voltage at the junction of biasing resistors 35 and 36; when the capacitor voltage exceeds this value, the output of op-amp 34 is at the supply potential. As previously stated, a near-square waveform of amplitude equal to the supply potential appears at the output of op-amp 29 in the presence of flicker, while the output of op-amp 29 is at ground potential otherwise. Therefore, the voltage at the positive input of op-amp 34 ranges from near-ground potential (in the absence of flicker) to approximately half the supply potential (when flicker is present). Thus, the negative input of op-amp 34 should be biased to approximately one-fourth the supply potential for best performance. In the preferred embodiment, resistor 35 has a value of 3.3 megohms, while resistor 36 has a value of 1.0 megohms. The requirements for op-amp 34 are non-critical; almost any modern op-amp could be used. In the preferred embodiment, op-amp 34 (like op-amps 22 and 29) is one of the four op-amps contained in the quad-op-amp MAX418 integrated circuit.

Alternative Configurations and Component Values

Those skilled in the art will recognize that many variations, enhancements, or simplifications of the exemplar circuit shown in FIG. 3 are possible. In particular, it is possible to implement the desired functions with only two op-amps, rather than the three shown. However, the circuit of FIG. 3 offers very good performance and long-term stability at an acceptably low cost. Some potentially advantageous alternatives will be discussed subsequently.

Figure 4:
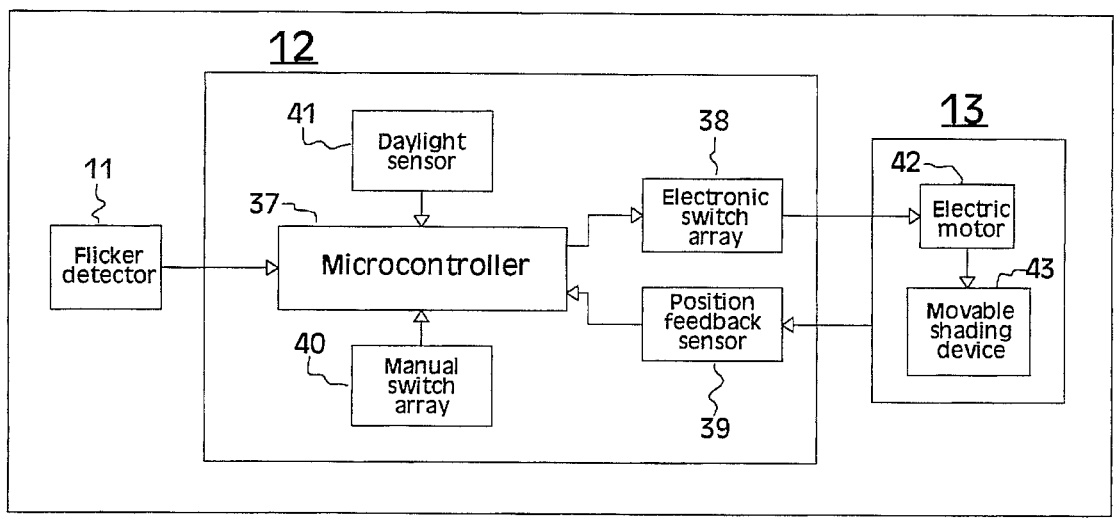
FIG. 4 is a block diagram of a preferred embodiment of a control apparatus, which is driven by the flicker detector.

FIG. 4: Detailed Block Diagram of Automatic Window Covering System 10

FIG. 4 shows a detailed block diagram of automatic window covering system 10. This diagram provides more detail than that shown previously in FIG. 1; in particular, it shows details of the preferred embodiments of control apparatus 12 and electronically controlled window covering 13. The preferred embodiment of control apparatus 12 consists of a microcontroller 37, an electronic switch array 38, a position feedback sensor 39, a manual switch array 40, and a daylight sensor 41. The preferred embodiment of electronically controlled window covering 13 consists of an electric motor 42 and a movable shading device 43.

Microcontroller 37

Microcontroller 37 is a conventional software-programmable control element having a plurality of Input/Output (I/O) lines or pins, a low-power sleep mode, and the capability to wake-up (i.e., exit the sleep mode and resume normal operation)—and generate a software interrupt—when the state of certain input pins changes. Many such microcontrollers are available; the PIC16C63, manufactured by Microchip Technology, Inc., is used in the preferred embodiment.

Electronic Switch Array 38

Electronic switch array 38 is connected to outputs of microcontroller 37. Electronic switch array 38 is a conventional arrangement of electronic switching devices, such as transistors or relays, which enable bi-directional operation of an electric motor in response to signals from a microcontroller. In the preferred embodiment, electronic switch array 38 is the Si9986CY Buffered H-Bridge motor driver Integrated Circuit (IC), manufactured by Siliconix Corp.

Motor 42

Electronic switch array 38 is connected (and controls the application of power) to electric motor 42. Electric motor 42 is a conventional electrically-driven rotary actuator, such as a brush-commutated DC motor, brushless DC motor, or stepping motor. In the preferred embodiment, electric motor 42 is a brush-commutated, permanent-magnet DC motor.

Shading Device 43

Electric motor 42 is coupled to movable shading device 43. Shading device 43 is a conventional device capable of variably shading or obscuring a window, such as a venetian blind, pleated shade, or roller shade. In the preferred embodiment, shading device 43 is a horizontal venetian blind. Motor 42 is coupled to shading device 43 in such a manner that operation of motor 42 actuates shading device 43, thereby varying the degree of shading of the host window. In the preferred embodiment, operation of motor 42 adjusts the tilt angle of the louvers of the venetian blind constituting shading device 43. This arrangement is functionally identical to that used in several commercially available motorized venetian blinds, including the model MB-1000 motorized miniblind, manufactured by Solartronics, Inc., of Buffalo, N.Y.

Position Feedback Sensor 39

Shading device 43 is directly or indirectly coupled to position feedback sensor 39. Position feedback sensor 39 is a conventional sensor capable of registering the movement of an electromechanically actuated member. Such sensors include rotary optical encoders, limit switches, linear displacement transducers, and current-discontinuity detectors (i.e., to detect the commutation-induced discontinuities in the drive current of brush-commutated DC motors). Such a sensor can be directly coupled to shading device 43, or can be directly coupled to motor 42 (and, hence, indirectly coupled to shading device 43). In the preferred embodiment, position feedback sensor 39 consists of an electronic current-discontinuity detector which produces a logic-level pulse on each commutation event of motor 42; thus, each output pulse of position feedback sensor 39 represents a fixed angular displacement of motor 42 (and hence, a fixed movement of shading device 43). The design of such a feedback sensor is described in detail in my above-referenced copending application.

Position feedback sensor 39, is, in turn, connected to inputs of microcontroller 37 in a known manner to enable microcontroller 37 to register movement of shading device 43.

Inter-Relationship of Elements 37, 38, 39, and 42

Thus, it can be seen that microcontroller 37 is capable of controlling the operation of motor 42 (via electronic switch array 38), thereby actuating movable shading device 43. It is also evident that the resulting movement of shading device 43 can be registered by microcontroller 37 (via position feedback sensor 39). Thus, the configuration of elements 37, 38, 39, and 42 is that of a conventional microcontroller-based digital servo-positioning system. This configuration is thoroughly described in the literature and is used in a variety of commercially available electronic devices. For example, this type of servo-positioning system is used in many of the power seat and power window mechanisms in modern luxury automobiles. A detailed description of such a servo-positioning system is given in Application Note AN532, entitled "Servo Control of a DC-Brush Motor Using the PIC17C42", presented in the *Embedded Control Handbook*, Microchip Technology, Inc., 1992. This reference provides a circuit diagram, operating description, and software listing for a microcontroller-based digital servo-positioning system.

Manual Switch Array 40

Manual switch array 40 is connected to inputs of microcontroller 37. Manual switch array 40 comprises an array of conventional manually-actuated switches. These switches are connected to inputs of microcontroller 37 in a known manner to enable microcontroller 37 to register their states, and to cause a wake-up from the sleep condition—and an interrupt in the software execution—when the state of any switch changes.

Daylight Sensor 41

Daylight sensor 41 is a conventional photoelectric sensor capable of detecting the presence of daylight, and of conveying this information to a microcontroller. Many such sensors are known in the art, including photodiodes, phototransistors, and photoresistors. In the preferred embodiment, daylight sensor 41 comprises a conventional cadmium sulfide photoresistor and a conventional voltage comparator (not shown) which has an adjustable reference voltage. This voltage is adjusted so that the output of daylight sensor 41 changes state at dusk and at dawn. This configuration is well-known and is used in a variety of commercially available products, including automatic street lamps. Daylight sensor 41 is connected to microcontroller 37 in a known manner to enable microcontroller 37 to register the state of daylight sensor 41, and to cause a wake-up from the sleep condition—and an interrupt in the software execution—when the state of daylight sensor 41 changes. Daylight sensor 41 is physically positioned between movable shading device 43 and the host window and is oriented to face the window, so that it is primarily sensitive to the outdoor illumination and not the artificial indoor illumination.

Overall Configuration of FIG. 4, Except Flicker Detector 11

Those versed in the art will recognize that—with the exception of flicker detector 11—the configuration shown in FIG. 4 is well-known, extensively described in the literature, and used in a variety of commercially available devices. In particular, the configuration of elements shown in FIG. 4—with the exception of flicker detector 11—is described in detail in my above-referenced co-pending application. This application describes a microcontroller-based system for automatic operation of conventional horizontal venetian blinds and pleated shades. It discusses implementations, potential alternatives, and software considerations for elements analogous to microcontroller 37, electronic switch array 38, position feedback sensor 39, manual switch array 40, daylight sensor 41, and electric motor 42.

Further descriptions of configurations functionally similar to that shown in FIG. 4 (with the exceptions of flicker detector 11 and daylight sensor 41) are given by Herbert McKinney, Jr. ("The Blind Robot," Circuit Cellar Ink, Issue No. 57, April 1995, p. 69), who describes the design, construction, and software of a microcontroller-based remote-control system to adjust the louver tilt of a horizontal venetian blind; and by Ming in U.S. Pat. No. 4,956,58 (1987), who describes a microcontroller-based system for automatic operation of a vertical venetian blind.

Flicker Detector 11

Again referring to FIG. 4, the output of flicker detector 11 is connected to an input of microcontroller 37 in a known manner to enable microcontroller 37 to register the state of flicker detector 11, and to cause a wake-up from the sleep condition—and an interrupt in the software execution—when the state of flicker detector 11 changes.

Summary of System 10

Thus, it can be seen that the configuration of automatic window covering system 10 shown in FIG. 4 is that of a microcontroller-based servo-positioning system, which is capable of closed-loop control of movable shading device 43 (via electronic switch array 38 and electric motor 42, and with feedback from position feedback sensor 39), under software control, in response to inputs from flicker detector 11, manual switch array 40, and daylight sensor 41.

Operation of the Preferred Embodiment

Operating Concept

Dual-Mode Operation

The operation of automatic window covering 10 is now described. In essence, automatic window covering 10 has two operating modes (as well as a programming mode, which will be described subsequently). Normally, automatic window covering system 10 will be in one of the two operating modes, with the mode of operation depending on the presence of artificial illumination (as sensed by flicker detector 11). If artificial illumination is present, then automatic window covering 10 operates in a Daylighting mode. If artificial illumination is not present, then automatic window covering operates in a Thermal Management mode.

Daylighting Mode

In the Daylighting mode, automatic window covering 10 provides natural, glare-free illumination. Upon entry into the Daylighting mode (i.e., upon incidence of artificial illumination as sensed by flicker detector 11), microcontroller 37 actuates motor 42 to move movable shading device 43 to a predetermined position, selected by the user, which provides reasonable illumination without glare (this predetermined position is stored within the memory of microcontroller 37 in the Programming mode, as described subsequently). The position selected by the user will necessarily be a compromise, since the optimum position of shading device 43 will generally vary with factors such as the distance from the window to the room occupants, the orientation of the window, the solar incidence angle, and the design of the shading device. In most cases, the selected position will be the same as the position which would normally be selected for a conventional, manually-operated window covering. For example, in the case of the venetian blind which constitutes shading device 43 in the preferred embodiment, a near-horizontal orientation of the louvers would be selected for a shaded window, while an orientation with the louvers sloping downward from inside to outside would be selected for a sunny window. [Alternatively, as described subsequently, automatic window covering 10 could be equipped with appropriate sensors to automatically maintain a near-optimum position of shading device 43 when in the Daylighting mode. However, such an embodiment would add cost and complexity to automatic window covering system 10, which may or may not be justified in a given application].

Thermal Management Mode

In the Thermal Management mode, automatic window covering 10 actuates movable shading device 43 to minimize the energy used for heating and cooling. Upon entry into the Thermal Management mode, microcontroller 37 actuates motor 42 to move movable shading device 43 to one of two predetermined positions (selected by the user), depending on the state of daylight sensor 41. These predetermined positions are stored within the memory of microcontroller 37 in the Programming mode, as will be described subsequently. These positions will vary with the season. In summer, it will be desirable to fully close shading device 43 during the daytime to minimize solar heat gain, and to fully open shading device 43 at night to maximize cooling. On the other hand, in winter, it will be desirable to fully open shading device 43 during the daytime to maximize solar heat gain, and to fully close shading device 43 at night to minimize heat loss. Many automatic window coverings have been developed for this purpose. For example, U.S. Pat. Nos. 4,644,990 to Webb (1987) and 5,413,161 to Corazzini (1995), as well as my above-referenced co-pending application, show venetian blind systems which are actuated automatically at dusk and dawn for the purpose of saving energy. Any of these approaches can be used in the Thermal Management mode of automatic window covering system 10.

Thus, it can be seen that automatic window covering system 10 has two operating modes (in addition to a programming mode to be described subsequently)—the Daylighting mode and the Thermal Management mode—with the prevailing mode determined by the output of flicker detector 11.

Software Operation

FIG. 4: Software Flowchart

Figure 5:
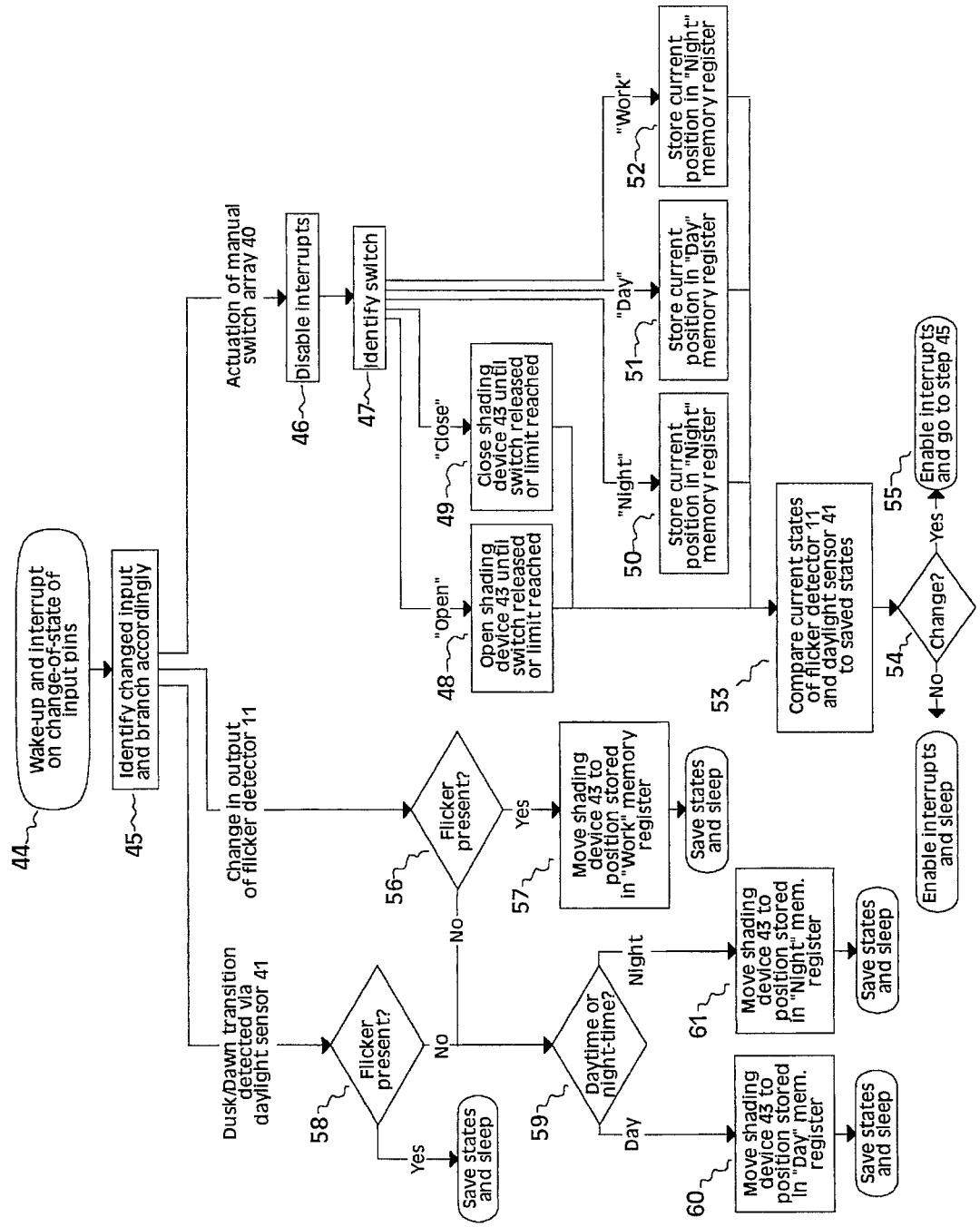
FIG. 5 is flowchart of the operations performed in a preferred embodiment of the software of the subject invention.

FIG. 5 shows a high-level flowchart of the software operations executed by microcontroller 37 in the operation of automatic window covering 10.
Software Steps 44 and 45

The software operations begin with a software step 44. Software step 44 is executed in response to a change-of-state of the input pins of microcontroller 37 which are connected to flicker detector 11, manual switch array 40, or daylight sensor 41 (these elements were previously shown in FIG. 3). In step 44, microcontroller 37 wakes up (if asleep) and executes an interrupt.

Following step 44, a software step 45 is executed, in which the software operation is directed to one of three branches, depending on the input causing the interrupt. This is done in the conventional manner by comparing the current states of the inputs with a previously saved state, and jumping to a predetermined program branch which depends on the difference between the current and saved states. It is possible for all three inputs to change state nearly simultaneously; therefore, software step 45 resolves conflicts by branching program execution according to the following priorities.

First priority interrupt source: change-of-state of manual switch array 40.

Second priority interrupt source: change-of-state of flicker detector 11.

Third priority interrupt source: change-of-state of daylight sensor 41.

Software step 45 causes a branch corresponding to the highest-priority interrupt source, while ignoring the other sources.
Software Steps 46 To 55

If manual switch array 40—the highest-priority interrupt source—is responsible for the interrupt, then a software step 46 is executed, in which interrupt capability is disabled, after which software step 47 is executed.

As previously stated, manual switch array 40 includes five switches, designated the Open, Close, Night, Day, and Work switches. In software step 47, the specific switch responsible for the interrupt is identified. If the Open switch is identified, a software step 48 is executed; if the Close switch is identified, a software step 49 is executed. Software steps 48 and 49 cause microcontroller 37 to actuate motor 43 to open and close, respectively, movable shading device 43. In either case, motor 43 is continuously actuated in the conventional manner until the switch is released, or until the physical travel limits of movable shading device 43 are reached. When either of these conditions occurs, a software step 53 is executed, which will be described subsequently.

If, in step 45, it is determined that one of the Night, Day, or Work switches is responsible for the interrupt, then software steps 50, 51, or 52, respectively, are executed. Software steps 50, 51, and 52 cause the current position of movable shading device 43 to be stored in one of three memory registers. These registers are designated the Night, Day, and Work registers. Thus, if the Night switch was responsible for the interrupt, then software step 50 causes the current position of shading device 43 to be stored in the Night memory register, after which software step 53 is executed. Similarly, if the Day switch was responsible for the wake-up, then software step 51 causes the current position of shading device 45 to be stored in the Day memory register, after which software step 53 is executed. Finally, if the Work switch was responsible for the wake-up, then software step 52 causes the current position of shading device 43 to be stored in the Work memory register, after which software step 53 is executed.

Thus, it can be seen that the Open and Close switches cause motor 43 to be operated to either open or close movable shading device 43 (in steps 46 and 47, respectively), while the Night, Day, and Work switches cause the current position of movable shading device 43 to be stored in corresponding memory registers (in steps 48, 49, and 50, respectively). This enables three positions of shading device 43 to be programmed, or preset, by the user.

After steps 48 through 52, software step 53 is executed. In step 53, the current states of flicker detector 11 and daylight sensor 41 are compared to the original, pre-interrupt states; then, in a step 54, execution is branched as a function of the result of the comparison. If the current and saved states are the same, then the interrupt capability (previously disabled in step 46) is enabled, and the sleep mode is entered.

If, however, the current and saved gates of flicker detector 11 and daylight sensor 41 are not equal, then a software step 55 is executed, in which interrupt capability is enabled and operation is branched to a software step 56. Step 56 will be described subsequently.

Software Steps 56 and 57

Referring again to step 45, if it is determined that a change of state of the output of flicker detector 11 (the interrupt source having the second-highest priority) is responsible for the wake-up, then step 56 is executed. Step 56 can also be entered from step 55, as previously described.

In step 56, the output of flicker detector 11 is examined to check for the presence of ambient flicker. If flicker is present, a step 57 is executed, in which motor 42 is actuated to move shading device 43 to the position stored in the Work memory register, after which the states of all inputs are saved and the sleep mode is resumed. If no flicker is present, then a step 59 is executed. Step 59 will be described subsequently.

Software Steps 58 to 61

If, in step 45, it is determined that a change of state of daylight sensor 41 (the interrupt source having the third-highest priority) is responsible for the wake-up, then a step 58 is executed. In step 58, the output of flicker detector 11 is examined to check for the presence of ambient flicker. If flicker is present, then the inputs states are saved and the sleep mode is resumed. However, if flicker is not present, then step 59 is executed. As previously stated, step 59 can also be entered from step 56.

In step 59, the output of daylight sensor 41 is examined. If daylight sensor 41 indicates the presence of daylight (i.e., that dawn has occurred), then a step 60 is executed, in which motor 42 is actuated to move shading device 43 to the position stored in the Day memory register, after which the input states are saved and the sleep mode is resumed. On the other hand, if daylight sensor 41 indicates the absence of daylight (i.e., that dusk has occurred), then a step 61 is executed, in which motor 42 is actuated to move shading device 43 to the position stored in the Night memory register, after which the input states are saved and the sleep mode is resumed.

Summary of Software Operation

Thus, steps 46 through 55 constitute the Programming mode, which enables the user to program or preset three arbitrary positions of movable shading device 43 in the Night, Day, and Work registers. It is also apparent that steps 56 and 57 implement the Daylighting mode, in which the incidence of flicker causes shading device 43 to be moved to the position memorized in the Work register. It can also be seen that software steps 58 through 61 enable the Thermal Management mode, in which movable shading device 43 is moved to either the position stored in the Day register or the position stored in the Night register, depending on whether dawn or dusk has last occurred. It can also be seen that the Daylighting mode (i.e., steps 56 and 57) cannot be entered unless flicker is present, while the Thermal Management mode (i.e., steps 58 through 61) cannot be entered unless flicker is absent. Thus, the Daylighting mode takes precedence over the Thermal Management mode.

Typical Usage

Programming

Typically, automatic window covering system 10 would be used to save energy in a high-rise office building. Periodically (at least once per season, and perhaps more frequently), the Day, Night, and Work memory registers of system 10 would be programmed with selected positions of movable shading device 43. In the preferred embodiment, movable shading device 43 is a venetian blind, and the positions stored in the Day, Night, and Work memory registers would correspond to desired tilt angles of the louvers of the venetian blind. In warmer seasons, the following louver tilt angles would be programmed:

in the Day register, a near-vertical tilt to minimize solar heat gain;

in the Night register, a near-horizontal tilt to maximize radiational cooling; and in the Work register, a tilt angle selected by the user which blocks direct solar radiation to the user's primary seating or working position, while still admitting substantial daylight (as previously noted, this position will necessarily be a compromise, and may have to be reprogrammed several times per season).

In the cooler seasons, the tilt angles programmed in the Day and Night registers would be reversed. This would result in programming of the following orientations:

in the Day register, a near-horizontal tilt to maximize solar gain; and in the Night register, a near-vertical tilt to minimize cooling.

As in the warmer seasons, the Work register would be programmed with a tilt angle which provides daylight without direct solar radiation.

As indicated in FIG. 5, each memory register would be programmed by simply actuating the Open or Close switches of manual switch array 40 to tilt the louvers to the desired orientation, and then pressing either the Day, Night, or Work switches of manual switch array 40 to store the tilt angle in the corresponding register.

Operation

After programming, automatic window covering system 10 would operate in the following manner:

When no artificial illumination is present, automatic window covering system 10 would remain in the Thermal Management mode, automatically tilting the louvers to the orientation stored in the Day register at dawn, and to the orientation stored in the Night register at Dusk.

When artificial illumination is present, automatic window covering system 10 would remain in the Daylighting mode, tilting the louvers to the tilt angle stored in the Work register, regardless of the presence or absence of daylight.

When artificial illumination ceases, automatic window covering system 10 would transition from the Daylighting mode to the Thermal Management mode, automatically tilting the louvers to the tilt angle stored in the Day register when daylight is present, and to the tilt angle stored in the Night register when daylight is absent.

Use in Conjunction With Adaptive Lighting

Although not strictly necessary, use of automatic window covering 10 would provide maximum energy-savings benefits when used in conjunction with an independent, adaptive, electric lighting system which is capable of automatically adjusting the lamp brightness to maintain a constant level of interior illumination. Examples of such systems include the automatic light-responsive apparatus shown in U.S. Pat. No. 2,269,324 to Turner (1942), the equi-visibility lighting control system shown in U.S. Pat. No. 4,273,999 to Pierpoint (1981), and the lighting control system shown in U.S. Pat. No. 5,357,170 to Luchaco (1994). The systems of Pierpoint and Luchaco are particularly intended for energy savings in commercial office buildings.

Automatic window covering system 10 would operate in conjunction with such a system in the following manner. When the adaptive lighting system is first turned on (which, in Luchaco's system, can be done automatically via a conventional occupancy sensor), system 10 would automatically enter the Daylighting mode, admitting natural illumination. The adaptive lighting system would then automatically dim the lights in response to the amount of admitted daylight, thereby reducing energy consumption. This would permit full realization of the energy-savings potential of automatic window covering system 10. In contrast to known integrated systems, no physical connection would be required between automatic window covering system 10 and the automatic lighting system, thus substantially reducing the costs of installation. Also, this approach would allow automatic window covering system 10 and the lighting system to be purchased and installed separately, thereby enabling an incremental installation.

Use Without Adaptive Lighting

Even without an adaptive lighting system, automatic window covering system 10 would still provide substantial energy-savings benefits.

First, automatic window covering 10 would still provide a significant energy-savings benefit (in the form of reduced heating and cooling costs) in the Thermal Management mode. While known dusk/dawn systems are capable in principle of providing the same benefit, the known systems force the user to adjust the window covering to the desired position (from either the fully-open or fully-closed positions associated with thermal management) when entering the room. For this reason, known dusk/dawn systems are often poorly received by office occupants. However, system 10 avoids this problem by automatically adjusting shading device 43 to a predetermined, comfortable position (via the Daylighting mode) when the lights are turned on.

Second, lower-wattage fluorescent lamps could be used in lighting fixtures near the window on which system 10 is installed. An inexpensive, efficient, manually operated desk or floor lamp could then be used for additional illumination whenever insufficient daylight is available (however, the wattage of such a desk or floor lamp, as well as its location, would have to be carefully selected to ensure that net energy consumption does not actually increase).

ALTERNATIVE EMBODIMENTS

Delayed Transitioning Between Modes

A potentially advantageous variation in the software operation of automatic window covering 10 is now described.

As previously shown in FIG. 5, automatic window covering system 10 enters the Daylighting mode immediately upon detection of artificial illumination, and enters the Thermal Management mode immediately upon cessation of artificial illumination. However, in certain circumstances, a delayed transition between modes may be advantageous.

For example, in offices equipped with automatic occupancy-sensing light switches, occupants may frequently leave and enter the office over the course of a work day, causing the artificial lights to turn off and on. It will generally not be desirable for automatic window covering 10 to respond to such short-term fluctuations in the presence of artificial illumination, since very little energy would be saved while wear and power consumption of motor 42 would be substantially increased. The increased power consumption would be particularly undesirable if system 10 were solar-powered.

This can be avoided by requiring that some predetermined interval without artificial illumination (e.g., one hour) elapse before transitioning from the Daylighting mode to the Thermal Management mode. This can be easily implemented in a known manner. For example, with reference to FIG. 5, a conventional delay loop could be inserted between software steps 56 and 59.

In most applications, the opposite transition—from the Thermal Management mode to the Daylighting mode—would preferably be immediate, especially in the morning hours. This would provide the office occupant with the benefits of natural illumination immediately upon arrival. However, in the evening hours, a delayed transition could be advantageous to allow the lights to be briefly illuminated (e.g., for security checks or cleaning), without causing operation of motor 42. This could be accomplished by inserting a conditional delay between steps 56 and 57, with the execution of the delay dependent on the output of daylight sensor 41: the delay would be bypassed if sensor 41 registers the presence of daylight.

Privacy Mode

In the software operation shown in FIG. 5, movable shading device 43 is automatically moved to the position stored in the Work register whenever artificial illumination is present. When daylight is present, this position provides natural illumination; when daylight is absent (e.g., on cloudy days and in the evening), this position provides the psychological benefits of an outdoor view. However, to enhance privacy, it may be desirable in some applications to close movable shading device 43 at night when the electric lighting is on. This can be easily accomplished in the preferred embodiment of automatic window covering system 10, since daylight sensor 41 is already present. This would require a Privacy mode and a fourth memory register, the Privacy register, in the operating software. The Privacy register would store a predetermined position of shading device 43 which provides maximum privacy, and the privacy mode would be engaged whenever artificial illumination is present (as sensed by flicker detector 11) in the absence of daylight (as sensed by daylight sensor 41).

FIG. 6A: Software Modification for Privacy Mode

Figure 6:
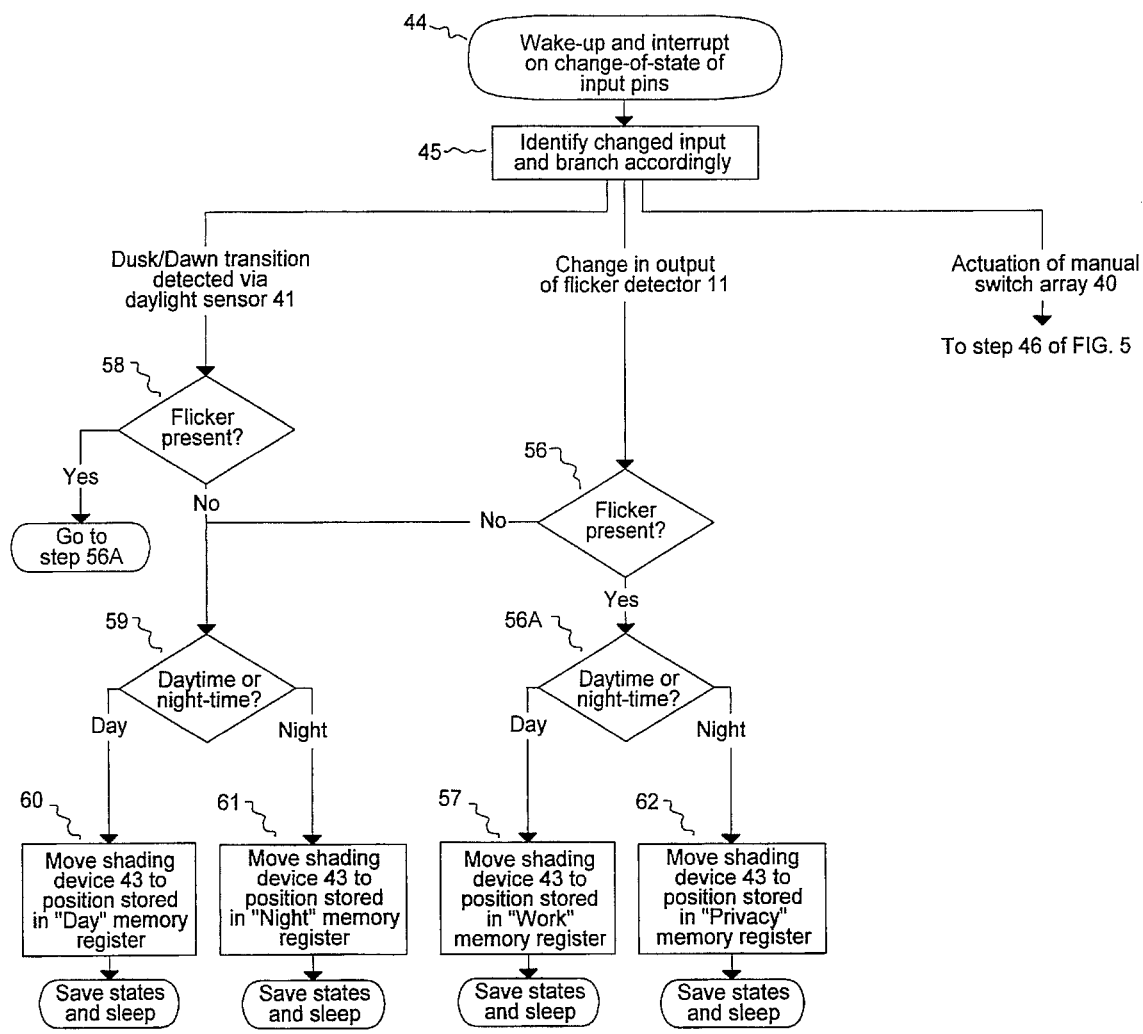
FIG. 6 shows a potentially advantageous modification of the flowchart of FIG. 5

FIG. 6 shows a modified version of the flowchart of FIG. 5 which implements such a modification. In FIG. 6, a software step 56A is inserted between steps 56 and 57. In software step 56A, the state of daylight sensor 41 is examined. If daylight is present, then step 57 is executed, moving shading device 43 to the position stored in the Work register. If, however, daylight is not present, then a step 62 is executed. In step 62, shading device 43 is moved to the position stored in the Privacy register. Thus, when ambient illumination is present, either the Daylighting mode or the Privacy mode is operative, depending on the presence of daylight.

Another change in FIG. 6, with respect to FIG. 5, is in step 58. If ambient flicker is detected in step 58, then execution branches to step 56A (rather than causing immediate entry into the sleep mode, as was shown in FIG. 5). This enables the system to transition from the Daylighting mode to the Privacy mode if dusk is detected by daylight sensor 41.

Adaptive Positioning of Shading Device 43 in Daylighting Mode

As previously stated, entry into the Daylighting mode causes shading device 43 to be moved to a fixed, predetermined position which provides natural illumination while blocking direct solar radiation (with the objective of avoiding glare). Use of a fixed, predetermined position in the Daylighting mode reduces the cost and complexity of the preferred embodiment. However, as previously noted, such a fixed position will necessarily be a compromise, since variations in weather, solar incidence angles, and room layout (among other factors) can substantially affect the optimum position of the window covering. In the case of the venetian blind of the preferred embodiment, for example, the louver orientation required to block direct solar radiation will be a function of the solar incidence angle.

As is known in the art, this problem can be overcome via automatic, adaptive positioning of shading device 43. Such adaptive positioning would be particularly advantageous in connection with automatic venetian blinds (as used in the preferred embodiment of system 10), for two reasons:

the venetian blind's capability for variable louver orientation provides a fine degree of illumination control, and the variable louver orientation enables direct solar radiation to be blocked, while still admitting diffuse illumination.

Several methods of adaptive positioning of venetian blinds are known in the art. One such method is aimed at maintaining a constant level of interior illumination, as sensed by an indoor photosensor. Such a system is shown in U.S. Pat. No. 3,646,985 to Klann (1972), in which the louver orientation of a venetian blind is constantly adjusted to maintain constant output of an interior-mounted photosensor.

Another method of adaptive positioning is aimed at maintaining a constant angle (e.g., 90 degrees) between the chord of the louvers and the incident solar radiation, thereby blocking direct solar radiation. One such system is shown in U.S. Pat. No. 5,142,133 to Kern (1992). Kern's system includes an solar angle-of-incidence sensor, and is capable of automatically maintaining a predetermined angle between the chord of the louvers and the incident radiation.

Many other methods are known; any of these can be implemented in the Daylighting mode of automatic window covering system 10. Adaptive positioning in the Daylighting mode could be readily implemented by making two modifications to the preferred embodiment:

including the required functions (e.g., as shown by Klann or Kern) within software step 57 (see FIGS. 5 and 6), and adding the appropriate solar angle-of-incidence sensor (e.g., as shown by Kern) or interior illumination sensor (e.g., as shown by Klann) to the preferred embodiment of control apparatus 12 (see FIG. 4).

Alternative Embodiments of Flicker Detector 11

As previously shown in FIG. 2, the preferred embodiment of flicker detector 11 consists of photosensor 15, AC-coupled amplifier 16, schmitt trigger 17, averager 18, and comparator 19. However, as will be apparent to those versed in the art, many other workable configurations are possible. Some of these are shown in FIGS. 7A through 7C, and discussed in the following paragraphs.

Figure 7A:
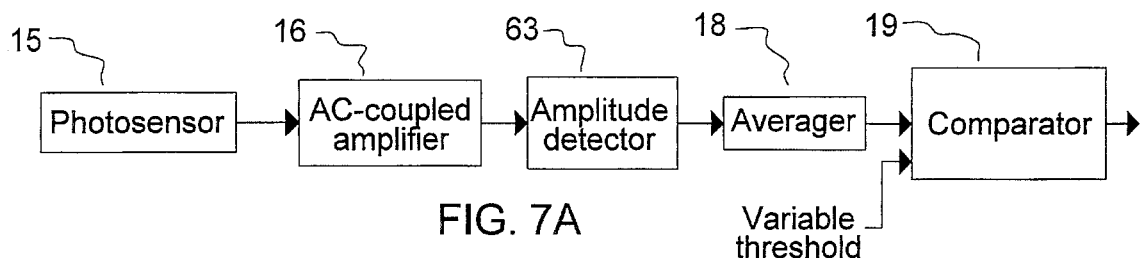
FIGS. 7A through 7C show block diagrams of potentially advantageous alternative embodiments of the flicker detector.
Figure 7B:
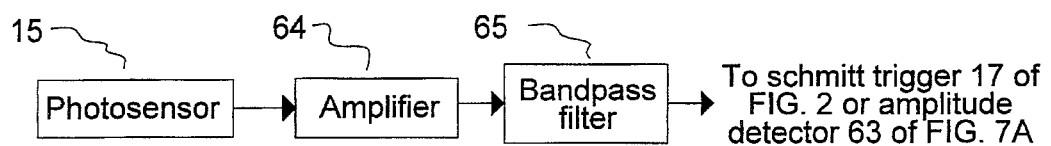
Figure 7C:
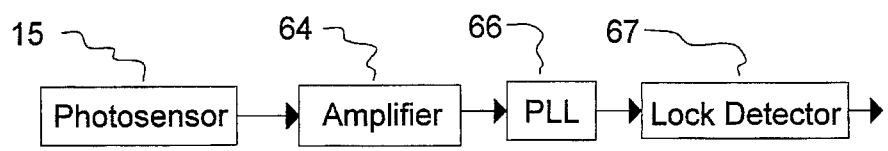

FIG. 7A: Amplitude Detector and Adjustable Threshold

FIG. 7A shows an approach in which a conventional amplitude detector 63 replaces schmitt trigger 17 of the preferred embodiment, and in which comparator 19 is provided with a conventional adjustable reference (in contrast to the fixed reference of the embodiment shown in FIGS. 2 and 3). The other elements of FIG. 7A perform in the same manner as previously described. This configuration is functionally identical to that shown in U.S. Pat. No. 4,041,308 to Fujita, which discloses an automatic system for the selection of photographic color filters.

Still referring to FIG. 7A, amplitude detector 63 is a conventional element capable of producing an output voltage proportional to the amplitude of an AC waveform. Many such elements are known, such as op-amp-based active rectifiers and passive diode detectors. The approach of FIG. 7A is slightly more complex than that shown in FIG. 2, and will typically be advantageous only if a variable detection threshold is required. This might be the case, for example, if flicker detector 11 is used in a room which shares a glass partition with a hallway or another room. In such a circumstance, illumination flicker passing through the partition might be sensed by the embodiment of FIG. 2, even though lamps in the host room are extinguished, causing a false output. With the embodiment of FIG. 7A, this problem can be overcome by adjusting the reference of comparator 19 (and, hence, the detection threshold of flicker detector 11).

FIG. 7B: Bandpass Filter

FIG. 7B shows an approach in which a conventional amplifier 64 and a conventional bandpass filter 65 replace the AC-coupled amplifier (with its high-pass characteristic)

of the approaches of FIGS. 2 and 7A. This configuration is functionally similar to the ripple detector shown in U.S. Pat. No. 4,595,946 to Uehara (1986), which discloses an automatic white balance system for color correction in a video camera.

Still referring to FIG. 7B, amplifier 64 may be AC-coupled or DC-coupled. Filter 65 has a passband centered on the desired flicker frequency, i.e. 120 hertz for conventional lamps. The approach of FIG. 7B will generally be more complex than that shown in FIGS. 2 or 7A, but might prove advantageous in two circumstances.

First, in environments which include significant flickering illumination from sources other than electric lamps (such as such as bright video display terminals and high-power infra-red remote controls and communications links), the bandpass approach of FIG. 7B can reduce false detections, to the extent that the flicker frequencies of these sources lie outside the passband of filter 65. In contrast, the high-pass characteristic of the AC-coupled amplifier approach of FIGS. 2 and 7A would be sensitive to any flickering illumination above the high-pass corner frequency of amplifier 16 (typically 60 hertz).

Second, by selecting a bandpass frequency equal to a harmonic of the flicker fundamental (e.g., 240 hertz), the bandpass approach of FIG. 7B can be made to respond only to illumination from fluorescent sources, while ignoring illumination from incandescent sources or the sun. This approach exploits the fact that nonlinear phenomena in the operation of fluorescent lamps gives rise to substantial harmonic energy in the flicker waveform, while the flicker produced by incandescent sources is almost purely sinusoidal. Such a scheme is shown in U.S. Pat. No. 5,087,936 to Ogata (1992), in which a flicker detector sensitive to the second harmonic of the flicker fundamental (e.g., 240 hertz for 60 hertz AC power) is used to distinguish fluorescent light from other types of illumination. This approach might be advantageous, for example, when it is desired that automatic window covering system 10 be responsive only to illumination from the ceiling-mounted fluorescent lamp, when a variety of incandescent task lamps or desk lamps are also present.

In most applications, however, the benefits provided by the approach of FIG. 7B will be outweighed by its increased complexity. And a significant disadvantage of the bandpass approach of FIG. 7B is that it may fail to detect the illumination produced by fluorescent lamps which use a high-frequency electronic ballast; usage of such lamps is increasing.

Multiple Filters to Identify Illumination Source

The bandpass approach of FIG. 7B can be extended to produce a flicker detector capable of identifying the type of ambient illumination sources. For example, U.S. Pat. No. 4,220,412 to Shroyer (1980) shows a flicker detector which includes a band-pass filter centered at the flicker fundamental, a high-pass filter passing frequencies above the fundamental, and peak-detection and logic circuits to measure the relative outputs of the filters. Shroyer's apparatus is capable of identifying the types of illumination which are present.

Such an approach would be significantly more complex than those shown in FIGS. 2 or 7A, and would be advantageous only in certain specialized applications of automatic window covering system 10. Moreover, this approach would potentially fail to respond to illumination produced by fluorescent lamps with high-frequency electronic ballasts.

FIG. 7C: Phase-Locked Loop

FIG. 7C shows another approach in which a Phase-Locked Loop (PLL) 66 and a lock detector 67 replace elements 17 through 19 of the embodiment shown in FIG. 2. PLL 66 is a conventional phase-locked loop which has a capture bandwidth centered on the desired flicker frequency, i.e. 120 hertz for conventional lamps. Lock detector 67 is a conventional element capable of generating a logic-level signal when PLL 66 is in a locked condition. Conventional integrated circuits (e.g., the LM567, manufactured by National Semiconductor Corp.) are available which include PLL 66 and lock detector 67 in a single package.

However, the approach of FIG. 7C will generally be more complex and expensive than the approaches of FIGS. 2 and 7A. It would provide greater immunity to flicker outside the PLL capture bandwidth, but this advantage will generally not be significant enough to justify the increased complexity of this approach.

Fourier Analysis Method of Gaboury

Another alternative flicker detection approach is shown in U.S. Pat. No. 4,827,119 to Gaboury (1989). Gaboury's approach amplifies and level-shifts the output of a photodetector and applies it to an Analog-to-Digital (A/D) converter, after which the digitized signal is processed in a microcontroller. The signal path from photodetector to A/D converter is DC-coupled and includes a logarithmic amplifier. Thus, the digitized signal includes the steady-state or DC component of the incident illumination (e.g., as produced by sunlight) as well as the flicker component, and is capable of representing a wide dynamic range of illumination levels. This enables Fourier-series analysis on the digitized waveform to determine the relative magnitudes of the steady-state illumination (e.g., as produced by sunlight), the 120 hertz illumination flicker (e.g., as produced by electric lamps), and the illumination flicker harmonics (e.g., as produced by fluorescent lamps).

Gaboury's approach offers significant benefits over the previously described approaches. With appropriate software, it can be made to respond only to incandescent or fluorescent sources. With a suitably-fast A/D converter, it can be made to respond to illumination produced by fluorescent lamps with high-frequency electronic ballasts. It can also be made to operate with variable thresholds for each illumination source. And, since Gaboury's approach is capable of determining the relative contributions from each illuminating source, it could facilitate coordinated operation of an integrated lighting/window covering system.

Since the preferred embodiment of automatic window covering system 10 already includes a microcontroller, Gaboury's apparatus could be readily substituted for the preferred embodiment of flicker detector 11 (particularly since many low-cost microcontrollers are available with integral A/D converters).

However, the need for an A/D converter increases cost, and the logarithmic amplifier of Gaboury's approach is more complex than the elements of the preferred embodiment of flicker detector 11 (as shown in FIGS. 2 and 3). Moreover, Gaboury's approach would result in increased power consumption, which would be disadvantageous in solar-powered embodiments of automatic window covering system 10.

Overall, the benefits of Gaboury's approach in the context of automatic window covering 10—while substantial—are currently insufficient to outweigh its added cost and complexity, except in specialized applications. This may change, however, as the cost and power dissipation of the required technologies continue to diminish.

Comparator Integral with Microcontroller

In the approaches of FIGS. 2, 7A, and 7B, comparator 19 has been shown as a part of flicker detector 11. However, many microcontrollers are available with integral comparators (often with software-programmable references). If such a device is used for microcontroller 37, then comparator 19 may be eliminated from flicker detector 11.

The use of a comparator integral with microcontroller 37—with a software-programmable reference—would be particularly advantageous with the amplitude detector approach of FIG. 7A. This would allow software-programmable detection thresholds of flicker detector 11, and facilitate rapid adjustment for operation in different environments. However, the use of a comparator integral with microcontroller 37 could increase the cost of microcontroller 37 and increase the overall power consumption of automatic window covering system 10 (which would be undesirable in solar-powered embodiments). In general, the selection between this approach and an external comparator can be made in accordance with conventional practice, with consideration given to factors such as overall cost, circuit complexity, and power consumption.

A/D Converter with Approach of FIG. 7A

The comparator of FIG. 7A could be replaced with an A/D converter, enabling the comparison or thresholding function to be performed in software within microcontroller 37. However, this approach could significantly increase the cost and power consumption of automatic window covering system 10; accordingly, it might prove less advantageous than the preferred approach, except in specialized applications.

Alternative Embodiments of Electronically Controlled Window Covering 13

As previously stated, the preferred embodiment of electronically controlled window covering 13 is a conventional, motorized, horizontal venetian blind. In this preferred embodiment, movable shading device 43 comprises a set of horizontal slats or louvers whose orientation or tilt can be varied through operation of electric motor 42. However, any window covering with electronically variable solar-optical properties could be used as window covering 13. In fact, any other means of electronically varying the illumination transmitted through the host window could be used in place of electronically controlled window covering 13. Some potentially advantageous alternatives to the preferred embodiment of electronically controlled window covering 13 are described in the following paragraphs, but any other variable illumination transmission means could be used according to the invention described herein.

Alternatives to Electric Motor 42

Window covering 13 need not include electric motor 42, but could instead be actuated by another type of electromechanical actuator, such as a solenoid or electrically heated bi-metallic strip. Many electronically controlled window coverings using such actuators are known in the art, such as the solenoid-operated venetian blind shown in U.S. Pat. No. 4,173,721 to Louis (1979) or the electrically actuated, shape-memory-alloy-driven venetian blind shown in U.S. Pat. No. 5,275,219 to Giacomel (1994).

Alternatives to Shading Device 43

As another example, shading device 43 of window covering 13 need not be a horizontal venetian blind; other conventional shading devices could also be used. These include vertical venetian blinds, pleated shades, drapes, and roller shades. Some examples of electronically controlled window coverings using such shading devices include:

the model 5100 motorized vertical venetian blind manufactured by SM Automatic of Culver City, Calif.;

the model SD-2000 motorized pleated shade manufactured by Solartronics, Inc., of Buffalo, N.Y.;

the Automatic Drapery Opener System manufactured by Makita USA, Inc., of La Miradd, Calif.; and the Roller Shade Lift System manufactured by Bautex USA, Inc., of Dallas, Tex.

Use of a Variable-Transmissivity Glazing

Finally, electronically controlled window covering 13 is not necessary if the host window is itself capable of electronically variable solar-optical properties. Variable-transmissivity liquid crystal glazings have been known for many years, and their use in window covering applications has been extensively studied. More recently, practical electrochromic glazings have become commercially available. The use of practical electrochromic glazings for window applications has recently been investigated, for example, at the Energy and Environment Division of Lawrence Berkeley Laboratory, Berkeley, Calif.

Such an electrochromic glazing could be built-in to the host window, or could be added to an existing window, to provide the functions previously described for electronically controlled window covering 13.

CONCLUSIONS, RAMIFICATIONS, AND SCOPE

From the preceding discussion, it is evident that automatic window covering system 10 is capable of two modes of operation—a Daylighting mode and a Thermal Management mode—with the Daylighting mode automatically engaged in the presence of artificial illumination, and the Thermal Management mode engaged in the absence of artificial illumination. Thus, automatic window covering system 10 is capable of operating to save costs of heating and cooling when electric illumination is not required, and to provide the energy-saving and psychological benefits of natural daylight when artificial illumination is required.

It is also evident that use of flicker detector 11 enables automatic window covering system 10 to achieve the aforementioned objects without need for a conventional occupancy sensor, and without need for wired or wireless external connections, thereby substantially reducing the cost of system 10 relative to prior-art approaches. Moreover, those versed in the art will recognize that flicker detector 11 is physically small and essentially non-directional, enabling an advantageous packaging and placement of system 10.

It is also evident that automatic window covering system 10 is most advantageously used with an independent, adaptive electric lighting system capable of automatically adjusting lamp brightness to maintain a constant level of interior illumination. However, it can be seen that system 10 would provide significant energy-savings and convenience benefits even if such a lighting system is not present.

Although automatic window covering system 10 is the preferred embodiment of the subject invention, it will be apparent that many other useful embodiments are possible, and that the subject invention may be advantageously coupled with other types of automatic window coverings. For example, the subject invention is complementary to the automatic venetian blind controller shown in my aforementioned co-pending application, and could be advantageously coupled with that system.

Those skilled in the art will recognize that the construction and function of the elements composing the preferred and alternative embodiments described herein may be modified, eliminated, or augmented to realize many other useful embodiments, without departing from the scope and spirit of the invention as recited in the appended claims.

I claim:

1. A system for automatic control of illumination transmitted through a host window, said system including:

A. means for electronically varying the illumination transmitted through said host window, said means having a control input, said means responsive to electrical signals registered on said control input;

B. means for detecting the periodic fluctuations in the illumination produced by an electric lamp powered by alternating current, said means having an output; and C. a control apparatus having a sensing input and a control output, said sensing input being connected to said output of said detecting means and said control output being connected to said control input of said variable illumination transmission means, so that said control apparatus is capable of registering the presence of said fluctuations, and of regulating the illumination transmitted through said host window on the basis of said presence.

2. A method of controlling the operation of a system for the automatic control of illumination transmitted through a host window, said system capable of a plurality of operating modes, said method comprising:

A. a first step of checking for the presence of periodic fluctuations in the ambient illumination, said fluctuations being produced by an electric lamp powered by alternating current; and B. a second step of selecting between said operating modes on the basis of the results of said first step.

* * * * *